United States Patent
Scarr et al.

(10) Patent No.: US 9,404,507 B2
(45) Date of Patent: Aug. 2, 2016

(54) INNER COWL STRUCTURE FOR AIRCRAFT TURBINE ENGINE

(71) Applicant: MRA Systems, Inc., Baltimore, MD (US)

(72) Inventors: Antony Brett Scarr, Bel Air, MD (US); Thomas Joseph Weir, Lutherville, MD (US); Allen Madsen Woolley, Rose Hill, KS (US); Carol Marie Janzon, Abingdon, MD (US)

(73) Assignee: MRA SYSTEMS, INC., Baltimore, MD (US)

( * ) Notice: Subject to any disclaimer, the term of this patent is extended or adjusted under 35 U.S.C. 154(b) by 633 days.

(21) Appl. No.: 13/862,941

(22) Filed: Apr. 15, 2013

(65) Prior Publication Data

US 2014/0319269 A1    Oct. 30, 2014

(51) Int. Cl.
*B64D 27/00* (2006.01)
*F04D 29/40* (2006.01)
*B64D 29/06* (2006.01)

(52) U.S. Cl.
CPC .............. *F04D 29/40* (2013.01); *B64D 29/06* (2013.01)

(58) Field of Classification Search
None
See application file for complete search history.

(56) References Cited

U.S. PATENT DOCUMENTS

| | | | | |
|---|---|---|---|---|
| 2,496,533 A * | 2/1950 | Hendrickson et al. | ......... | 82/165 |
| 4,278,220 A * | 7/1981 | Johnston et al. | ......... | 244/110 B |
| 4,442,987 A * | 4/1984 | Legrand et al. | ........... | 244/110 B |
| 4,634,081 A * | 1/1987 | Chee | ................................ | 244/54 |
| 4,683,717 A * | 8/1987 | Naud | ......................... | 60/226.1 |
| 5,085,343 A * | 2/1992 | Scarr | ......................... | 220/560.1 |
| 5,275,357 A * | 1/1994 | Seelen et al. | .................... | 244/54 |
| 5,350,136 A * | 9/1994 | Prosser et al. | ............. | 244/129.4 |
| 6,554,224 B2 * | 4/2003 | Sternberger | .............. | 244/110 B |
| 6,843,449 B1 * | 1/2005 | Manteiga et al. | ............... | 244/54 |
| 8,016,227 B2 * | 9/2011 | Hammer | ..................... | 244/53 R |
| 8,448,896 B2 * | 5/2013 | Caruel et al. | .................... | 244/54 |
| 8,869,507 B2 * | 10/2014 | Cloft et al. | .................. | 60/226.3 |
| 2008/0169378 A1 * | 7/2008 | Beaufort et al. | ............... | 244/54 |
| 2008/0251633 A1 * | 10/2008 | Journade et al. | ............... | 244/54 |
| 2009/0165463 A1 * | 7/2009 | Vauchel et al. | ................. | 60/797 |
| 2011/0284686 A1 * | 11/2011 | Caruel et al. | ................... | 244/54 |
| 2012/0080554 A1 * | 4/2012 | Lafont et al. | .................... | 244/54 |
| 2012/0247571 A1 * | 10/2012 | Vauchel et al. | .............. | 137/15.1 |
| 2012/0308379 A1 * | 12/2012 | Scarr | ......................... | 415/215.1 |
| 2013/0105622 A1 * | 5/2013 | Journade | ......................... | 244/54 |
| 2013/0243589 A1 * | 9/2013 | Caruel | ....................... | 415/213.1 |

(Continued)

FOREIGN PATENT DOCUMENTS

EP    0155887 A1    9/1985
FR    2896481 A1    7/2007

(Continued)

OTHER PUBLICATIONS

European Search Report and Written Opinion issued in connection with corresponding EP Application No. 14164001.1-1754 dated Jul. 8, 2014.

Primary Examiner — Medhat Badawi
(74) Attorney, Agent, or Firm — GE Global Patent Operation; William S. Munnerlyn

(57) ABSTRACT

An inner cowl structure for circumscribing at least a portion of a jet engine extending from an aircraft includes an apron configured to mount directly to the engine independent of the pylon and overly an upper portion of the jet engine, and an inner body configured to circumscribe a portion of the jet engine not circumscribed by the apron.

19 Claims, 5 Drawing Sheets

(56) References Cited

U.S. PATENT DOCUMENTS

2013/0312387 A1* 11/2013 West et al. .................. 60/226.2
2014/0151497 A1* 6/2014 Weir et al. ...................... 244/54
2014/0234090 A1* 8/2014 Hurlin et al. ............... 415/182.1

FOREIGN PATENT DOCUMENTS

FR 2926790 A1 7/2009
FR 2941673 A1 8/2010

* cited by examiner

INNER COWL STRUCTURE FOR AIRCRAFT TURBINE ENGINE

BACKGROUND OF THE INVENTION

Turbine engines, and particularly gas turbine engines, also known as combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes. In airplanes, gas turbine engines are used for propulsion of the aircraft.

The engine is attached to a wing by a pylon, typically a metal arm that joins the engine to the wing or fuselage of the aircraft. Through pumps and feed tubes in the pylons, fuel is relayed from wing tanks to the engine. Additionally, electrical power generated by the engine, as well as hydraulic lines and air management system ducts, control system wiring, etc. are routed between the aircraft and engine through wires and piping also contained in the pylons. The engine is contained within external casings, called cowls. These cowls typically form the inner wall of a fan duct on aircraft applications. These engine cowls are supported in part by the pylon and in part by the engine.

Conventional cowl arrangements include the inner and outer cowls that are structurally attached to each other via bifurcation walls and beams that permit hinged opening and closing of the cowls for engine access, and in some cases permit sliding of the outer cowl for thrust reverser operations. In other arrangements the inner cowl remains independent from the outer cowl (i.e. has no direct structural attachment between the cowls). In this case the inner cowling covers the jet engine and has either a fixed frame structure with many access panels to provide engine access or hinged opening forward doors with a sliding aft cowl section that may be moved to provide access for maintenance of the jet engine.

BRIEF DESCRIPTION OF THE INVENTION

In one aspect, an inner cowl structure for circumscribing at least a portion of a jet engine having at least one engine mount coupled to an engine pylon extending from an aircraft wing, the inner cowl structure includes an apron configured to mount directly to the engine independent of the pylon and overly an upper portion of the jet engine, and an inner body configured to circumscribe a portion of the jet engine not circumscribed by the apron, wherein the inner cowl body is coupled to the apron such that the resulting combination of the coupled apron and inner cowl body defines a hoop structure that is structurally independent of the pylon and completely circumscribes at least a portion of the jet engine.

In another aspect, an aircraft assembly including a wing, an engine pylon mounted to the wing, a jet engine mounted to the engine pylon with at least one engine mount connection, and an inner cowl structure. The inner cowl structure further includes an apron mounted directly to the engine independent of the pylon and overlying an upper portion of the jet engine, and an inner cowl body configured to circumscribe a portion of the jet engine not circumscribed by the apron. The inner cowl body is coupled to the apron such that the resulting combination of the coupled apron and inner cowl body defines a hoop structure that is structurally independent of the pylon and completely circumscribes at least a portion of the jet engine.

DESCRIPTION OF EMBODIMENTS OF THE INVENTION

The invention may be implemented in any environment using a gas turbine engine that provides propulsive force for aircraft. Additionally, embodiments of this description is also applicable to a turbine engine providing a power generation and/or providing both a driving force and power generation. Further, while embodiments of this description is directed toward a jet engine aircraft environment, the invention is applicable in any environment using a turbine engine that also uses cowls.

Figure 1:
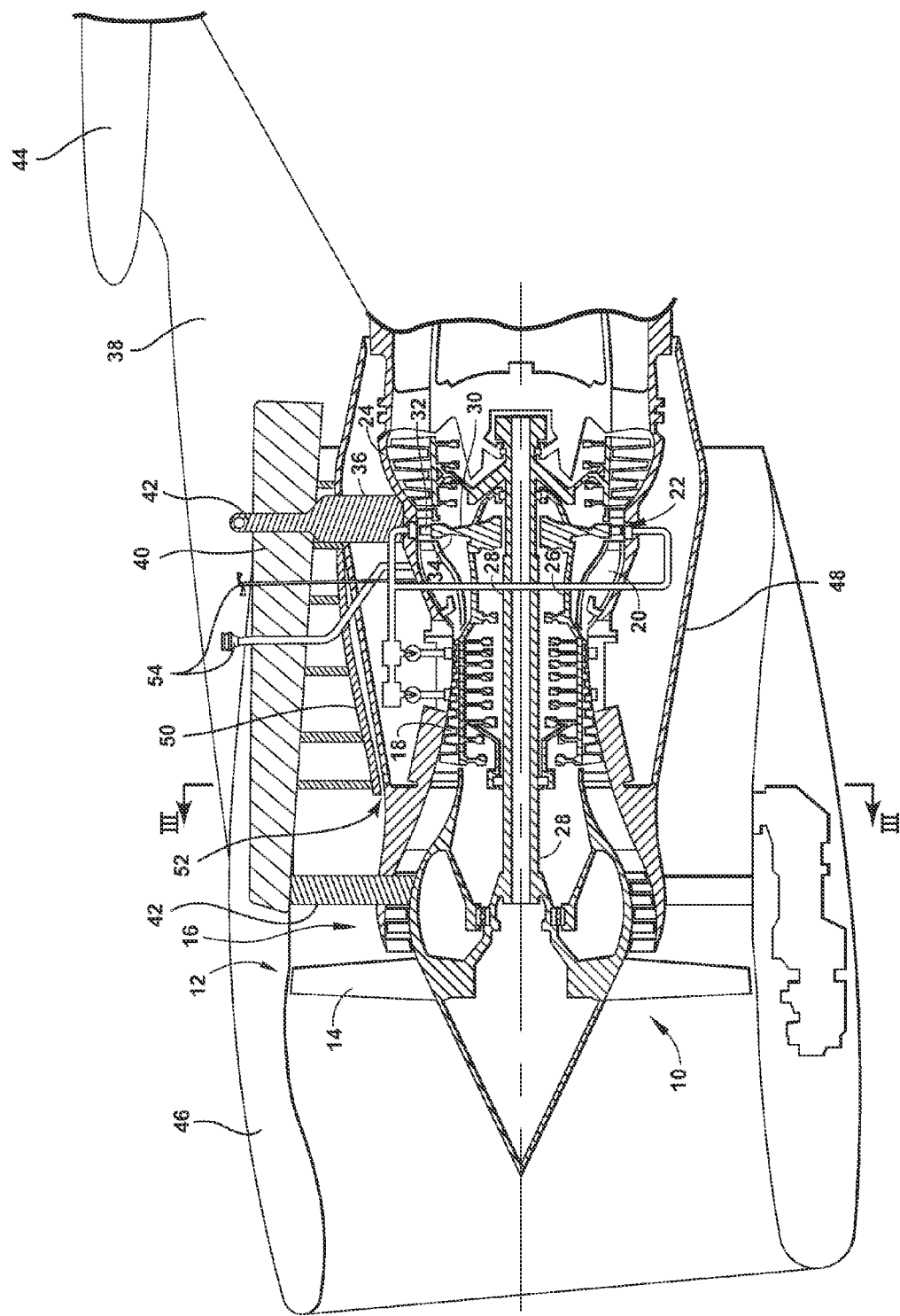
FIG. 1 is a cross-sectional side view of a typical gas turbine engine, cowling, pylon, and wing, according to one embodiment of the invention.

FIG. 1 is a schematic cross-sectional diagram of a gas turbine engine 10 for an aircraft. The engine 10 includes, in downstream serial flow relationship, a fan section 12 including a fan 14, a booster or low pressure (LP) compressor 16, a high pressure (HP) compressor 18, a combustion section 20, a HP turbine 22, and a LP turbine 24. An HP shaft or spool 26 drivingly connects HP turbine 22 to HP compressor 18 and an LP shaft or spool 28 drivingly connects LP turbine 24 to LP compressor 16 and fan 14. HP turbine 22 includes an HP turbine rotor 30 having turbine blades 32 mounted at a periphery of rotor 30. Blades 32 extend radially outwardly from blade platforms 34 to radially outer blade tips 36.

The engine 10 is shown mounted to the pylon assembly 38, at a pylon primary structure 40, by both aft and fore engine mounts 42. The pylon assembly 38, as illustrated, further secures to the aircraft wing 44 in a vertical orientation, but may be secured at alternate positions of the aircraft, such as to the fuselage in a horizontal orientation.

The engine 10 further includes an outer cowl 46 and an inner cowl 48, each having smooth surfaces to reduce the drag of air passing inside or outside the engine 10 in flight. The outer cowl 46 encircles at least a portion of the inner cowl 48 and the engine 10. The pylon assembly 38 further comprises bifurcation walls 50, connected to and extending from the pylon assembly 38 toward the inner cowl 48, defining a gap 52 which is sealed to preserve effective fan air passage along the fan duct between the inner cowl 48 and outer cowl 46.

Also illustrated are a multitude of connector lines 54, such as hydraulic lines, electrical lines and bypass air lines, extending from the engine 10 through the bifurcation walls 50 into the pylon assembly 38. These lines 54 coupling the engine 10 to subsystems necessary for operation, such as fuel pumps and flight control computers.

Figure 2:
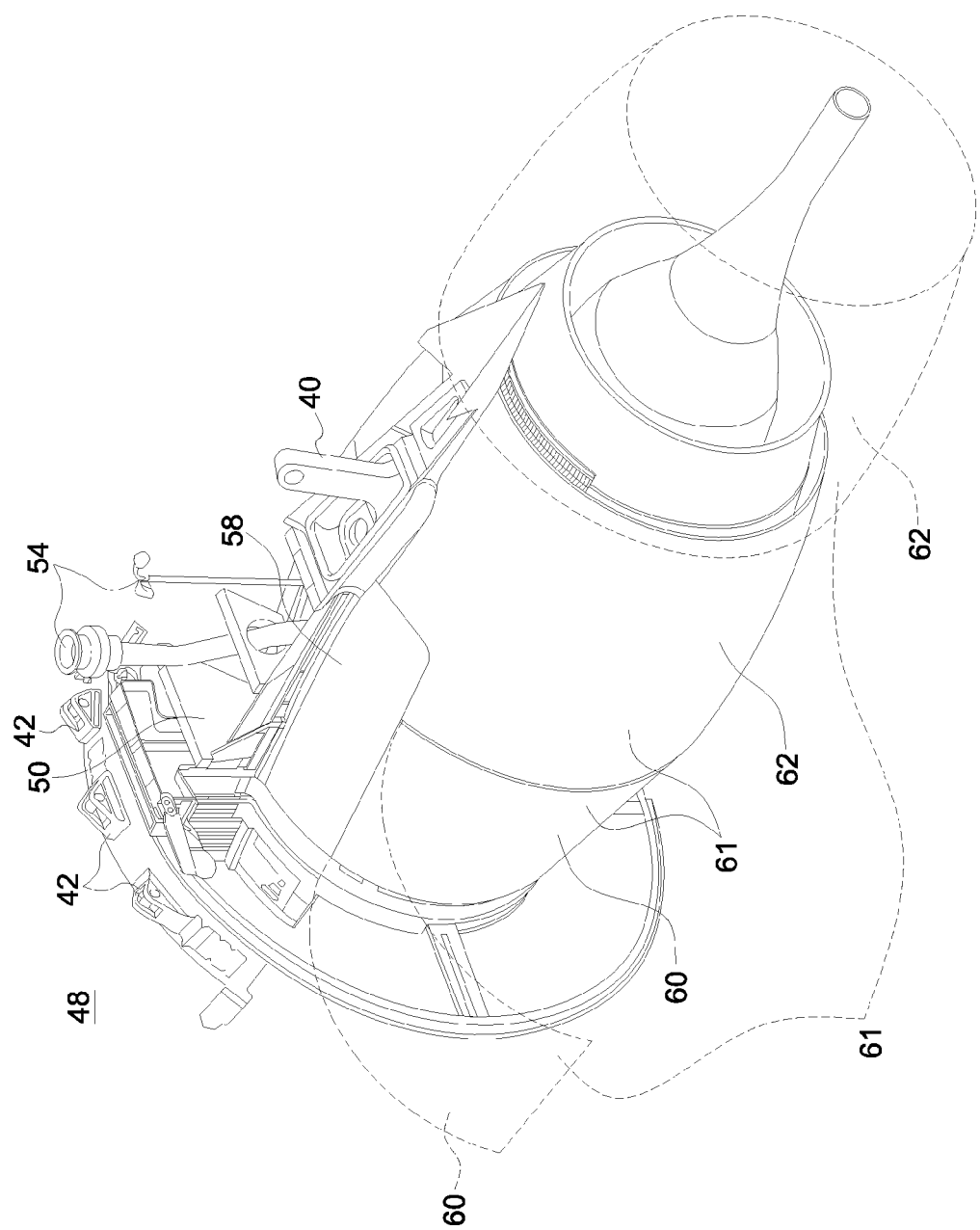
FIG. 2 is a perspective view of the cowling and apron, according to one embodiment of the invention.

Turning now to FIG. 2, the inner cowl 48 comprises an apron structure 58, and an inner cowl body 61 that includes two side forward cowl doors 60, and an aft cowl door 62 circumscribing at least a portion of the engine 10. Alternate configurations of cowling are envisioned. The apron 58 overlies an upper portion of the engine 10 while the forward cowl doors 60 and aft cowl door 62 collectively circumscribe the remaining portion of the engine 10 not overlied by the apron 58. The forward cowl doors 60 hingedly open whereas the aft cowl door 62 slidably opens.

Figure 3:
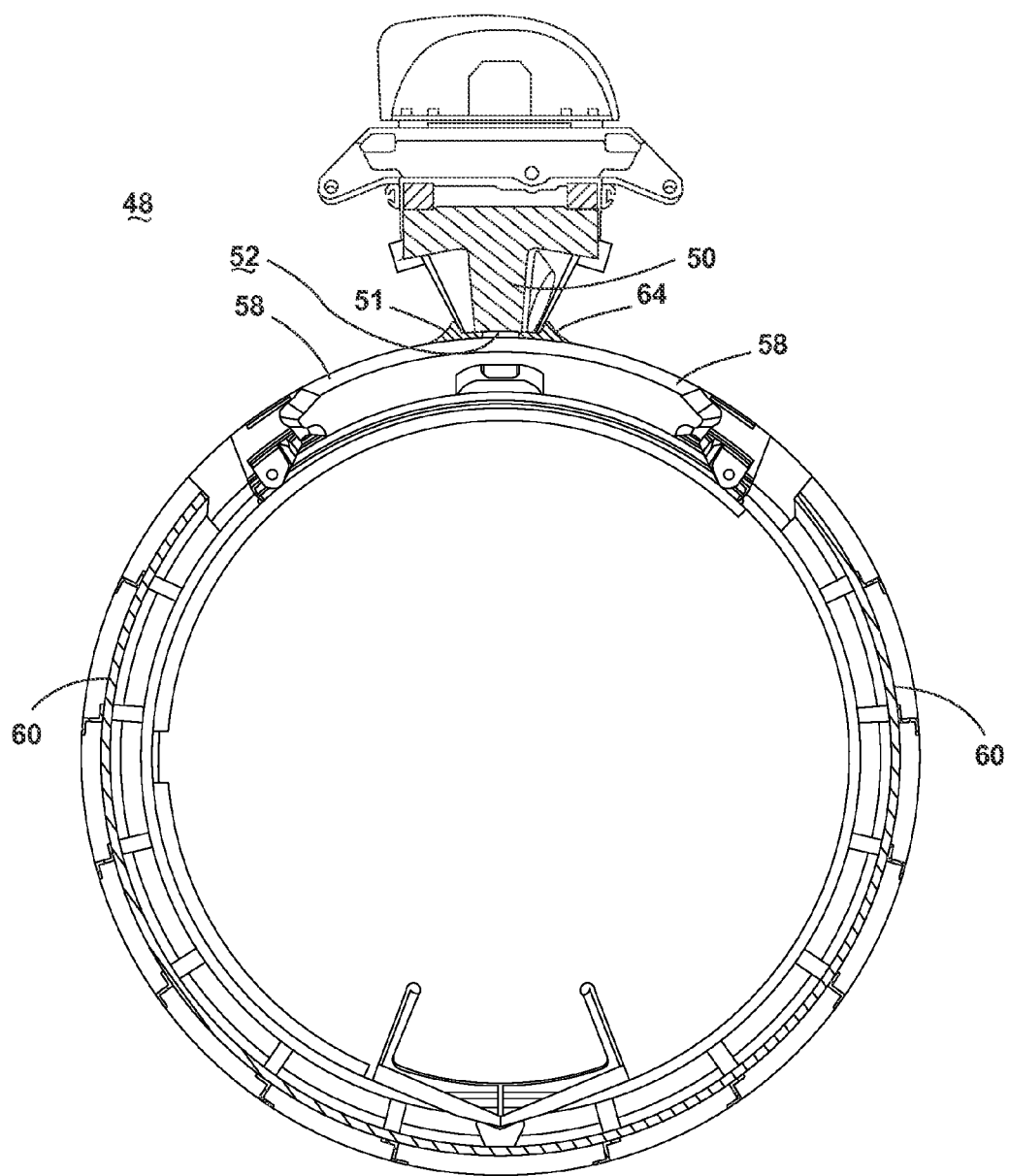
FIG. 3 is a partial sectional view taken along line 3-3 of FIG. 1 showing the hoop structure.

As shown in FIG. 3, the assembled apron 58 and cowl doors 60, 62 create a continuous hoop-wise structure that extends along the axial length of the inner cowl 48. As illustrated, the apron 58 further comprises a sealing compound 51 at the edges of gap 52 between the bifurcation walls 50 and the apron 58. One example of the sealing compound 51 is aero seal 64; however, other compounds that provide a soft, flexible seal between such interfaces are envisioned. Also as shown, the forward cowl doors 60 each circumscribe a mirrored-opposite side portion of the forward engine 10 such that the lower edges of the doors 60 meet each one another at the lowest point of the inner cowl 48.

Figure 4:
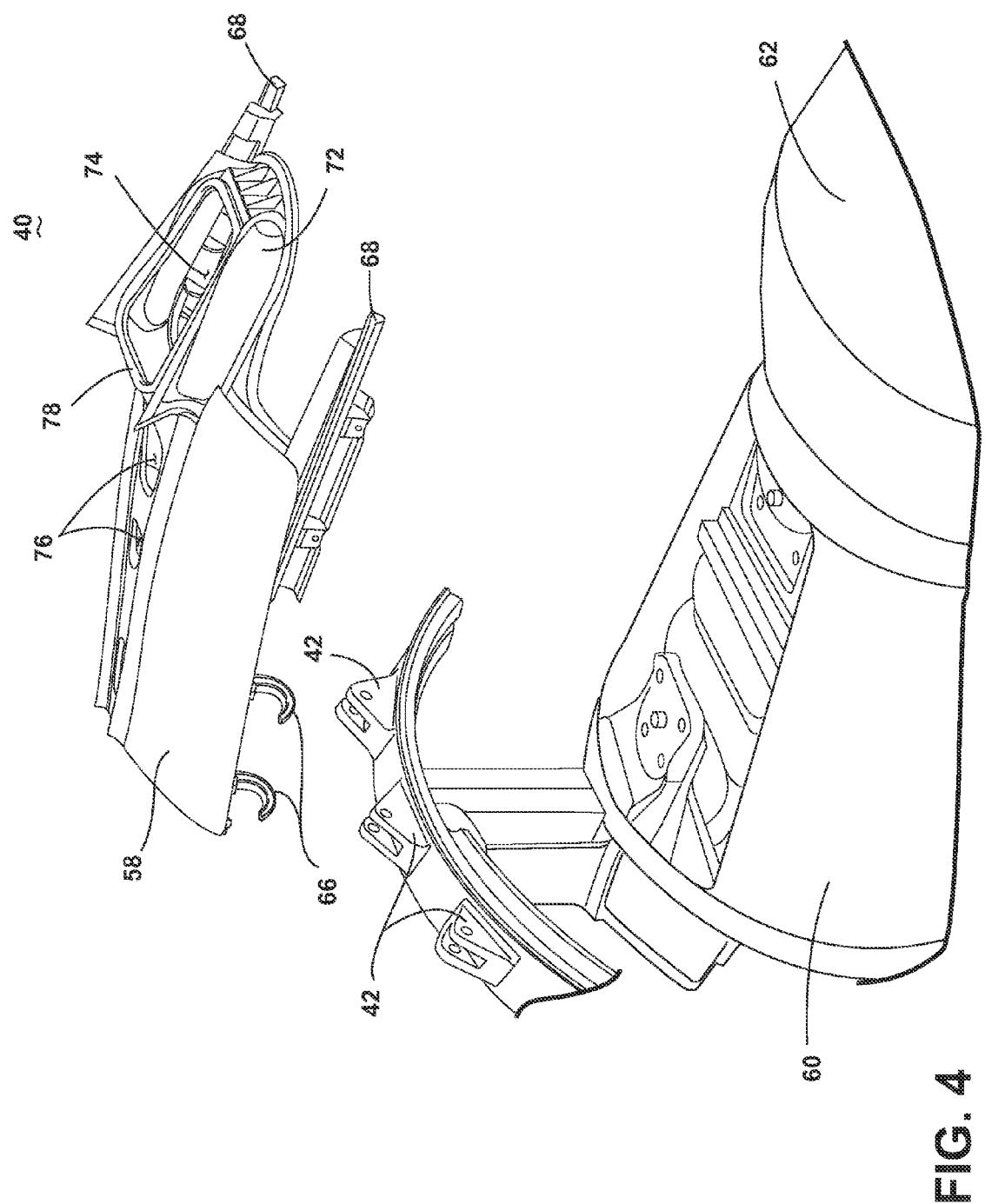
FIG. 4 is a perspective view of the apron structure.

Turning now to FIG. 4, the apron 58 comprises support hinges 66 and railings 68 for actuating the cowl doors 60, 62. The forward cowl doors 60 couple to the apron 58 via the hinges 66 and are configured such that the hinges 66 create a pivot point, allowing the doors 60 to swing up and away from the engine 10 during maintenance. Likewise, the railings 68 allow for coupling of the aft cowl door 62 to the apron 58 such that the door 62 may be translated axially, for example by sliding, along the length of the engine 10 from a fore position to an aft position, relative to the apron 58 and engine 10, during maintenance. In the present configuration, both the hinges 66 and the railings 68 are made from suitable materials robust enough to support the loads of their respective cowl doors 60, 62 during flight or maintenance operations.

The apron 58 yet further comprises a collar 72 that abuts the pylon assembly 38. The apron 58 yet further comprises at least one opening permitting a pass through connection to the engine 10. As illustrated, the collar 72 includes a collar opening 74, wherein the engine mount 42 passes through to secure the engine 10 to the pylon primary structure 40. The apron 58 is shown having additional openings 76 for the connector lines 54, however, it is envisioned that additional connections may be permitted to pass through the collar opening 74.

The collar 72 further comprises a seal structure 78 corresponding to and circumscribing the collar opening 74. The seal structure 78 is configured in such a way that when the collar 72 abuts the pylon assembly 38, the seal structure 78 seals the collar opening 74 relative to the pylon assembly 38. The seal structure 78 may comprise any suitable soft, flexible material able to form a substantially air and weather-proof seal.

Figure 5:
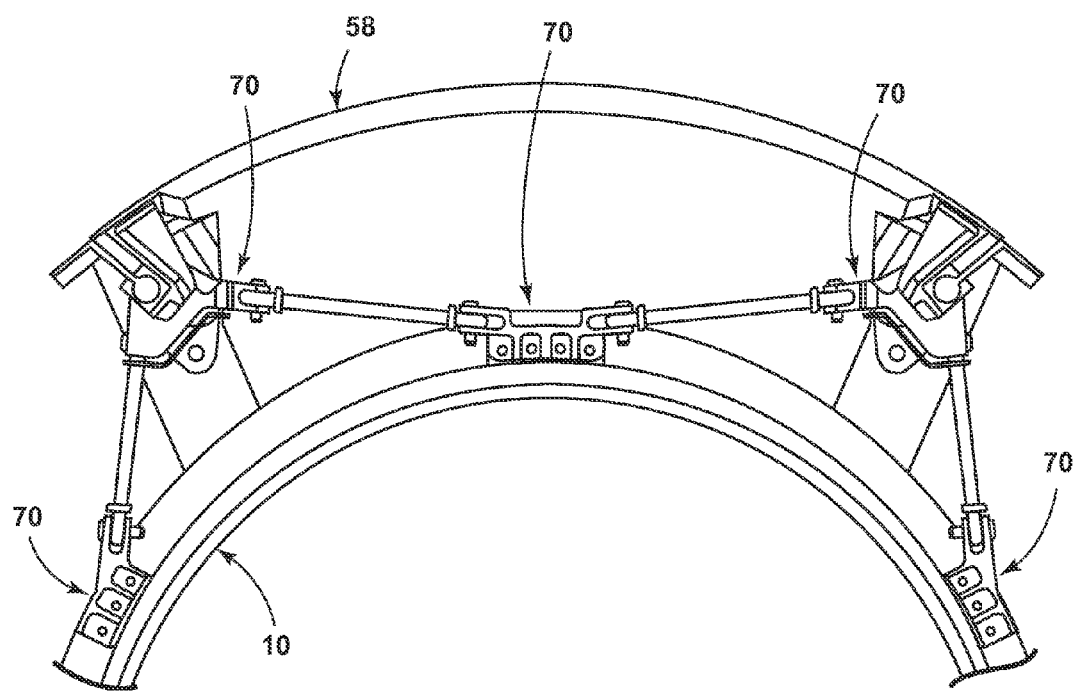
FIG. 5 is a partial sectional view showing the apron mounting brackets.

Turning to FIG. 5, the apron 58 further comprises apron mounts 70 for structurally coupling the apron 58 to the engine 10. In this sense, the engine 10 supports the weight of the inner cowl 48, which is structurally independent of the pylon assembly 38. The apron mounts 70 comprise materials suitable to support the combined weight of the apron 58, forward cowl doors 60, and the aft cowl door 62, as well as any transient forces applied to the inner cowl 48 during flight or maintenance operations. Alternate configurations of apron mounts 70 are envisioned.

During flight operation, an inner cowl 48 circumscribing an engine 10 providing thrust to an aircraft, will experience gravitational and displacement loads. The gravitational loads, or weight of the inner cowl 48, are carried from the cowl doors 60, 62, through the apron 58, to the engine 10 by the apron mounts 70. The hoop-wise continuous structure of the apron 58 and cowl doors 60, 62 provide a structurally efficient design for carrying the weight of the inner cowling 48.

The displacement loads acting upon the inner cowl 48 originate, mainly, from airstream effects, turbulence, and vibration of the engines 10. While the apron mounts 70 may provide both structural stiffness and damping effects, the inner cowl 48 is still slightly displaced relative to the pylon assembly 38. This displacement is accounted for at the interface to the pylon assembly 38, by the aero seal 64 at the apron and bifurcation walls 50 and the seal structure 78 at the collar 72 and the pylon assembly 38. The soft, flexible material of each seal 64, 78 allows for displacement without separation at each interface. Furthermore, the hoop-wise continuous structure of the apron 58 and cowl doors 60, 62 provide a structurally efficient design for withstanding warping or deflection under displacement loads.

Many other possible embodiments and configurations in addition to that shown in the above figures are contemplated by the present disclosure. For example, one embodiment of the invention contemplates an apron 58 that further circumscribes the engine 10 or extends further axially, removing or reducing the need for additional cowl doors 60, 62. Furthermore, a multitude of embodiments having alternate cowl door 60, 62 designs may be employed, so long as the inner cowl 48 is structurally anchored to an apron 58 in each such embodiment. Additionally, the design and placement of the various components may be rearranged such that a number of different configurations could be realized.

The embodiments disclosed herein provide an inner cowl structure for a turbine engine. One advantage that may be realized in the above embodiments is that the above described embodiments have superior complexity and lower cost design advantages over the conventional type inner cowl structures. With the proposed apron mounting structure about the engine, a high structural integrity of the inner cowl can be achieved due to the hoop-wise strength, while structurally isolating the cowling from any direct connection to the pylon or pylon bracket. Moreover, given that the dominant loading cases of the inner cowl is pressure driven, the hoop-wise continuous structure of the described embodiments are especially efficient.

Another advantage that may be realized in the above embodiments is that the inner cowl provides a means to minimize the thermal effect of engine heat on the lower floor of the pylon due to the structural separation and isolation barrier between the apron and the bifurcation walls. Creating this isolation barrier also decreases the engine fire zone volume, benefiting other subsystems such as fire detection and suppression.

Additionally, the described embodiments have superior weight advantages over conventional type inner cowl structures. The design of the apron structure allows for decoupling of the inner cowl structure from the pylon or pylon bracket, removing the need for the pylon to bare the structural loads and displacement challenges of the inner cowl due to engine thrust and aerodynamic forces. Moreover, the lower temperatures on the pylon, as explained above, also allow for lighter materials to be used leading to lighter and simplified structures without displacing weight to another area of a propulsion system. Thus the pylon and pylon bracket may be designed, developed, and machined in alternate, lighter materials that are no longer required to withstand the forces or thermal loads that would otherwise be applied at pylon interfaces.

Yet another advantage that may be realized in the above embodiments is that the apron structure also provides a simpler means for sealing the inner cowl about the engine. The sealing of the inner cowl additionally reduces fan duct leakage of the engine, which will have a direct effect to engine fuel consumption.

When designing aircraft components, important factors to address are size and weight. The above described advantages of the inner cowl structure results in a lower weight, smaller sized, and increased performance engine system. Reduced weight and size correlate to competitive advantages during flight.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An inner cowl structure for circumscribing at least a portion of a jet engine having at least one engine mount coupled to an engine pylon extending from an aircraft wing, the inner cowl structure comprising:
    an apron, comprising at least one of support hinges or railings for actuating cowl doors, and configured to mount directly to the engine independent of the pylon and cover an upper portion of the jet engine; and
    an inner cowl body configured to circumscribe a portion of the jet engine not circumscribed by the apron;
    wherein the inner cowl body is at least one of hingedly or slidably coupled to the apron such that the resulting combination of the coupled apron and inner cowl body defines a hoop structure that is structurally independent of the pylon and completely circumscribes at least an axial portion of the jet engine.

2. The inner cowl structure of claim 1 wherein the apron comprises at least one opening through which a connection with the engine is permitted.

3. The inner cowl structure of claim 2 wherein the apron further comprises a seal structure corresponding to the at least one opening, and sealing the at least one opening relative to the pylon.

4. The inner cowl structure of claim 3 wherein the seal structure comprises a collar circumscribing the at least one opening, and terminates in a seal that abuts the pylon.

5. The inner cowl structure of claim 2 wherein the connection comprises an engine mount connection between the engine and the pylon.

6. The inner cowl structure of claim 1 wherein the inner cowl body comprises a forward portion and an aft portion.

7. The inner cowl structure of claim 6 wherein the aft portion is mounted for fore/aft slidable movement relative to the apron.

8. The inner cowl structure of claim 7 wherein the railings comprises a slide rail to which the aft portion is slidably coupled.

9. The inner cowl structure of claim 7 wherein the forward portion comprises a pair of doors, each door hingedly mounted to the apron.

10. The inner cowl structure of claim 9 wherein each of the doors lies on an opposite side of the engine.

11. An aircraft assembly comprising:
    a wing;
    an engine pylon mounted to the wing;
    a jet engine mounted to the engine pylon with at least one engine mount connection;
    an inner cowl structure comprising:
        an apron mounted directly to the engine independent of the pylon and cover an upper portion of the jet engine and comprising support hinges for actuating cowl doors; and
        an inner cowl body configured to circumscribe a portion of the jet engine not circumscribed by the apron, wherein the inner cowl body comprises a forward portion and an aft portion;
    wherein the forward portion of the inner cowl body is hingedly coupled to the apron such that the resulting combination of the coupled apron and the forward portion of the inner cowl body defines a hoop structure that is structurally independent of the pylon and completely circumscribes at least a first axial portion of the jet engine.

12. The aircraft assembly of claim 11 wherein the apron comprises at least one opening through which a connection with the engine is permitted.

13. The aircraft assembly of claim 12 wherein the apron further comprises a seal structure corresponding to the at least one opening and sealing the at least one opening relative to the pylon.

14. The aircraft assembly of claim 13 wherein the seal structure comprises a collar circumscribing the at least one opening and abutting the pylon.

15. The aircraft assembly of claim 14 wherein the connection comprises the engine mount connection.

16. The aircraft assembly of claim 11 wherein the aft portion is mounted for fore/aft slidable movement relative to the apron.

17. The aircraft assembly of claim 16 wherein the apron further comprises a slide rail to which the aft portion is slidably coupled.

18. The aircraft assembly of claim 16 wherein the forward portion comprises a pair of doors, each door hingedly mounted to the apron.

19. The aircraft assembly of claim 18 wherein each of the doors lies on an opposite side of the engine.

* * * * *